(12) United States Patent
Yu

(10) Patent No.: US 6,959,641 B1
(45) Date of Patent: Nov. 1, 2005

(54) BARBEQUE STICK FOR BARBEQUE STOVE

(76) Inventor: Shu-Feng Yu, 11F., No. 14, Lane 71, Ande St., Sindian City, Taipei County (TW)

(*) Notice: Subject to any disclaimer, the term of this patent is extended or adjusted under 35 U.S.C. 154(b) by 0 days.

(21) Appl. No.: 10/963,803

(22) Filed: Oct. 14, 2004

(51) Int. Cl.⁷ .......................... A23L 1/00; A47J 37/00; A47J 37/04; A47J 43/18
(52) U.S. Cl. .................... 99/421 A; 99/419; 99/421 H
(58) Field of Search ............. 99/339, 340, 419–421 V, 99/394, 444–450; 30/321–323, 34.05, 123.5, 30/123.6, 123.7, 342; 294/61, 5, 1.1; 16/426, 16/427, 422, 110.1, DIG. 24; 84/94.2; 426/523

(56) References Cited

U.S. PATENT DOCUMENTS

| | | | | |
|---|---|---|---|---|
| 3,742,840 A | * | 7/1973 | Cogswell | 99/421 A |
| 4,126,086 A | * | 11/1978 | Valade | 99/419 |
| 4,176,592 A | * | 12/1979 | Doyle, Jr. | 99/419 |
| 4,258,617 A | * | 3/1981 | Akwei | 99/419 |
| 4,539,751 A | * | 9/1985 | Chan | 30/322 |
| 4,982,657 A | * | 1/1991 | Ghenic | 99/421 A |
| 5,715,744 A | * | 2/1998 | Coutant | 99/421 H |
| 5,775,207 A | * | 7/1998 | Warren | 99/394 |
| 5,918,534 A | * | 7/1999 | Medina | 99/342 |
| 6,196,121 B1 | * | 3/2001 | Crowl | 99/421 A |
| 6,286,418 B1 | * | 9/2001 | Berke et al. | 99/421 A |
| 6,354,195 B1 | * | 3/2002 | Huang | 99/421 H |
| 6,813,993 B1 | * | 11/2004 | Liu | 99/421 A |

* cited by examiner

Primary Examiner—Timothy F. Simone
(74) Attorney, Agent, or Firm—Bacon & Thomas

(57) ABSTRACT

The present invention discloses a barbeque stick for barbeque stoves, which installs a first liner and a second liner in a handle and forms a barbeque stick by connecting the first liner with a rod, and the barbeque stick is installed onto a barbeque stove. If it is necessary to install the barbeque stick onto a different sized barbeque stove, the first liner is removed and a pivotal cover is connected to the second liner to form a fixing cover, and the position of the fixing cover is adjusted to a length equal to the distance between both sides of the different sized stove, such that one end of the rod and the fixing cover are coupled to both sidewalls of the different sized barbeque stove respectively, and thus the rod can be coupled to barbeque stoves of different sizes.

11 Claims, 4 Drawing Sheets

BARBEQUE STICK FOR BARBEQUE STOVE

FIELD OF THE INVENTION

The present invention generally relates to a barbeque stick, more particularly to a barbeque stick capable of being used for barbeque stoves of different sizes.

BACKGROUND OF THE INVENTION

Please refer to FIG. 1 for an embodiment of a traditional barbeque stove 10, which comprises a stove 11 being coupled to a stove base 12 and having an upper casing 111 pivotally coupled to a lower casing 112; a rod base 14 and a mechanical base 13 being disposed on two corresponding sidewalls 113, 114 of the stove 11 respectively; wherein a motor 15 is installed on the mechanical base 13; an insert hole 151 is disposed at a position of a rotary axle center of the motor 15 and faces one side of the rod base 14; and an opening 141 is disposed on the rod base 14 and aligned precisely with the insert hole 151, such that when one end of a barbeque stick 16 is coupled with the insert hole 151 and the other end is coupled with the opening 141, then the barbeque stick 16 is parallel to the upper and lower casings 111, 112; and when the motor 15 is turned on, the insert hole 151 is rotated to drive the barbeque stick 16 to rotate in the same direction as well. Food such as mutton brochette or chicken brochette is stuck on the barbeque stick 16, and thus the food can be heated evenly by the heating substance (such as coal or alcohol) of the stove 11 and the rotation of the barbeque stick 16 to cook a delicious dish.

Further, the barbeque stick 16 comprises a rod 161 and a handle 162. Please refer to FIG. 1 again. An end of the rod 161 facing an end of the motor 15 is coupled to the handle 161 and the other end is coupled with the insert hole 151, and the section of the rod 161 adjacent to the handle 162 is coupled with the opening 151 such that the barbeque stick 16 can be rotated in the same direction above the lower casing 112 according to the rotation of the insert hole 151. Further, the handle 162 is substantially in a long cylindrical shape to facilitate users to take the heated barbeque stick 16 from the stove 11 by the handle 162 and protect the user from getting burned by the heated barbeque stick 16.

However, the barbeque stick of such prior art is usually installed on a stove of the same size. If the stove is broken, then it is necessary to replace the barbeque stick together with the barbeque stove and thus wastes resources. Therefore, designing a barbeque stick that can be installed on barbeque stoves of different size is an important subject that demands immediate attention.

SUMMARY OF THE INVENTION

In view of the aforementioned problem that a barbeque stick cannot be installed onto stoves of different sizes, and results in a waste of resources since the barbeque stick has to be replaced together with the stove, the inventor of the present invention based on years of experience and professional knowledge in related field to conduct extensive researches and experiments and finally invented a barbeque stick for barbeque stoves according to the present invention.

The primary objective of the present invention is to install a first liner and a second liner in a handle and form a barbeque stick by connecting the first liner with a rod, and the barbeque stick is installed onto a barbeque stove. If it is necessary to install the barbeque stick onto a different sized barbeque stove, the first liner is removed and a pivotal cover is connected to the second liner to form a fixing cover, and the position of the fixing cover is adjusted to a length equal to the distance between both sides of the different sized stove, such that one end of the rod and the fixing cover are coupled to both sidewalls of the different sized barbeque stove respectively, and thus the rod can be coupled to barbeque stoves of different sizes.

The above and other objects, features and advantages of the present invention will become apparent from the following detailed description taken with the accompanying drawings.

DETAILED DESCRIPTION OF THE PREFERRED EMBODIMENTS

Figure 1:
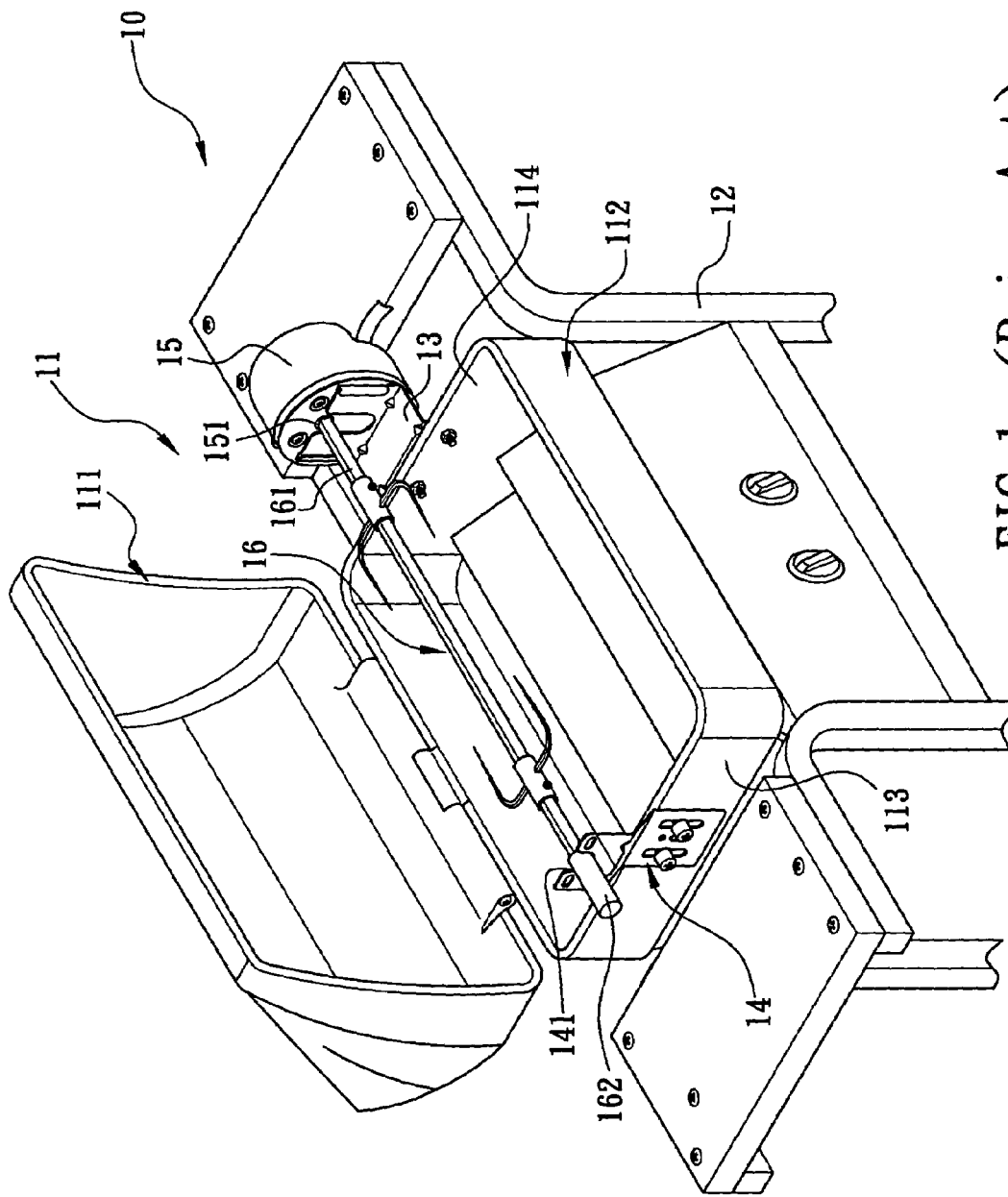
FIG. 1 is a perspective view of a prior-art barbeque stove.
Figure 2:
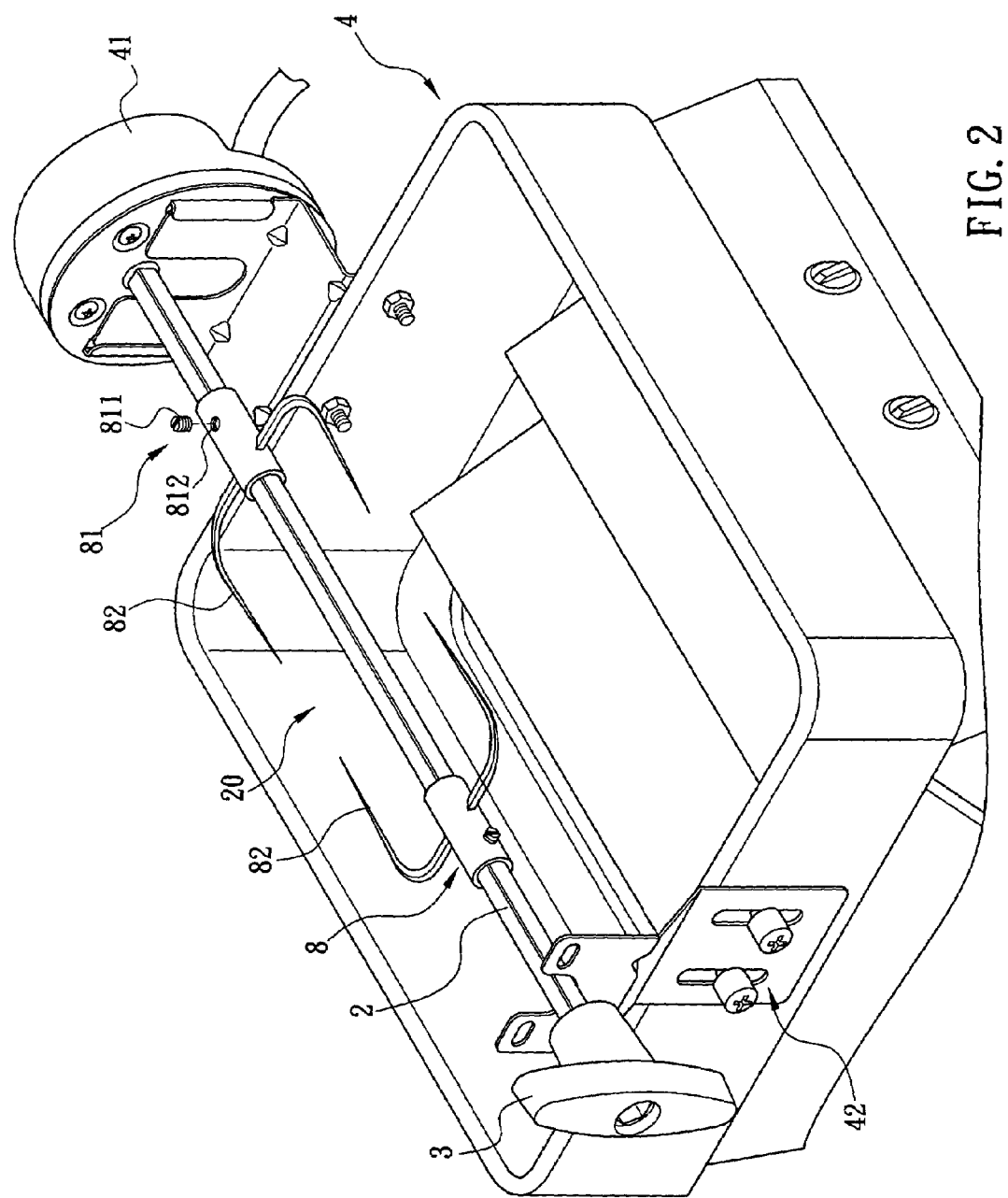
FIG. 2 is a perspective view of the barbeque stove according to the present invention.
Figure 3:
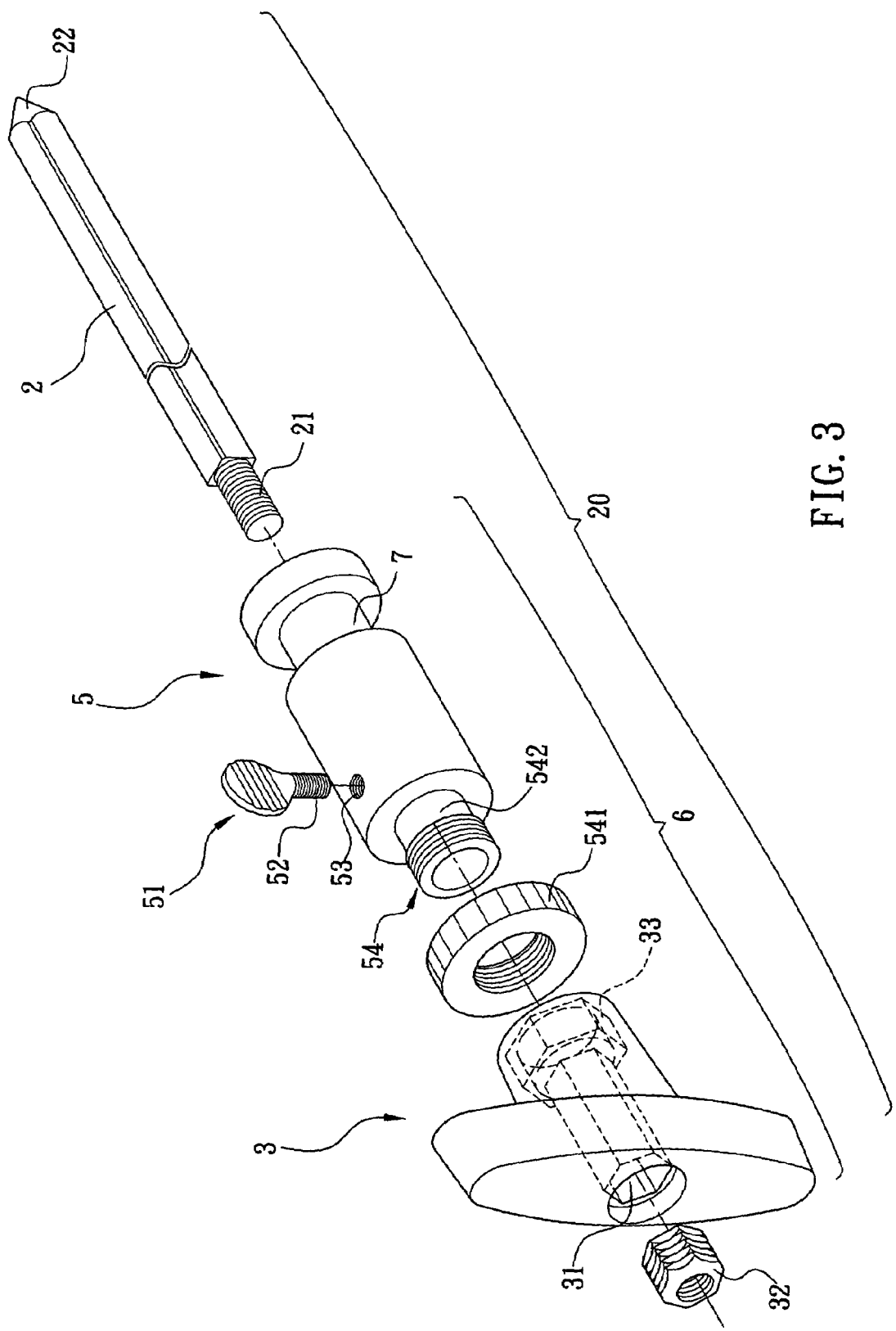
FIG. 3 is an exploded view of the barbeque stick according to a preferred embodiment of the present invention.

Please refer to FIG. 3 for the barbeque stick for a barbeque stove according to the present invention, which comprises a rod 2; a connecting section 21 coupled to one end of the rod 2; a pointed end 22 coupled to another end of the rod 2; a hollow handle 3, a latch section 31 disposed at the internal edge of the handle 3, and the latch section is provided for movably latching a first liner 32 and a second liner 33 disposed on one end, such that when the handle 3 is installed on the rod 2, the handle 3 is coupled with the connecting section 21 by the first liner 32 to constitute a barbeque stick 20 identical with the prior-art barbeque stick 16 (as shown in FIG. 1). Please refer to FIG. 2. The pointed end 22 is connected to a motor 41 disposed on one side of the barbeque stove 4, and the section of rod 2 proximate to the handle 3 can be placed on a rod base 42 disposed on another side of the barbeque stove 4.

If it is necessary to place the rod 2 onto a barbeque stove of a smaller size, the second liner 33 is provided for connecting to a pivotal cover 5 to constitute a fixing cover 6. Please refer to FIG. 3. After the fixing cover 6 is sheathed onto the rod 2, the first liner 32 can be separated from the coupling position of the latch section 31 and removed from the handle as to move the fixing cover 6 to any appropriate position on the rod 2, and thus the position of the fixing cover 6 on the rod is adjusted to a length equal to the distance between both sides of the smaller barbeque stove in order to connect one end of the rod 2 onto the motor of the smaller barbeque stove. Further, the rod can be placed on the rod base of a smaller barbeque stove by the fixing cover 6, such that the rod 2 can be coupled with a smaller barbeque stove.

Please refer to FIG. 3 for a preferred embodiment of the present invention. The pivotal cover 5 comprises a lock 51 disposed at an end proximate to the first liner 32, such that the fixing cover 6 at the position of the rod 2 is adjusted to a length equal to the distance between both sides of the smaller barbeque stove to fix the fixing cover 6 at that position by the lock 51 and prevent the fixing cover 6 from freely moving. In this embodiment, the lock 51 comprises a thread section 52 disposed at an end facing the pivotal cover 5 and a screw hole 53 disposed at the position where the pivotal cover 5 and the lock 51 are coupled, such that the lock 51 is screwed into the screw hole 53 by the screw section 52 and extended to be in contact with the rod 2 and one end of the lock 51 presses on the rod 2 to fix the pivotal cover 5 onto the rod 2.

Figure 4:
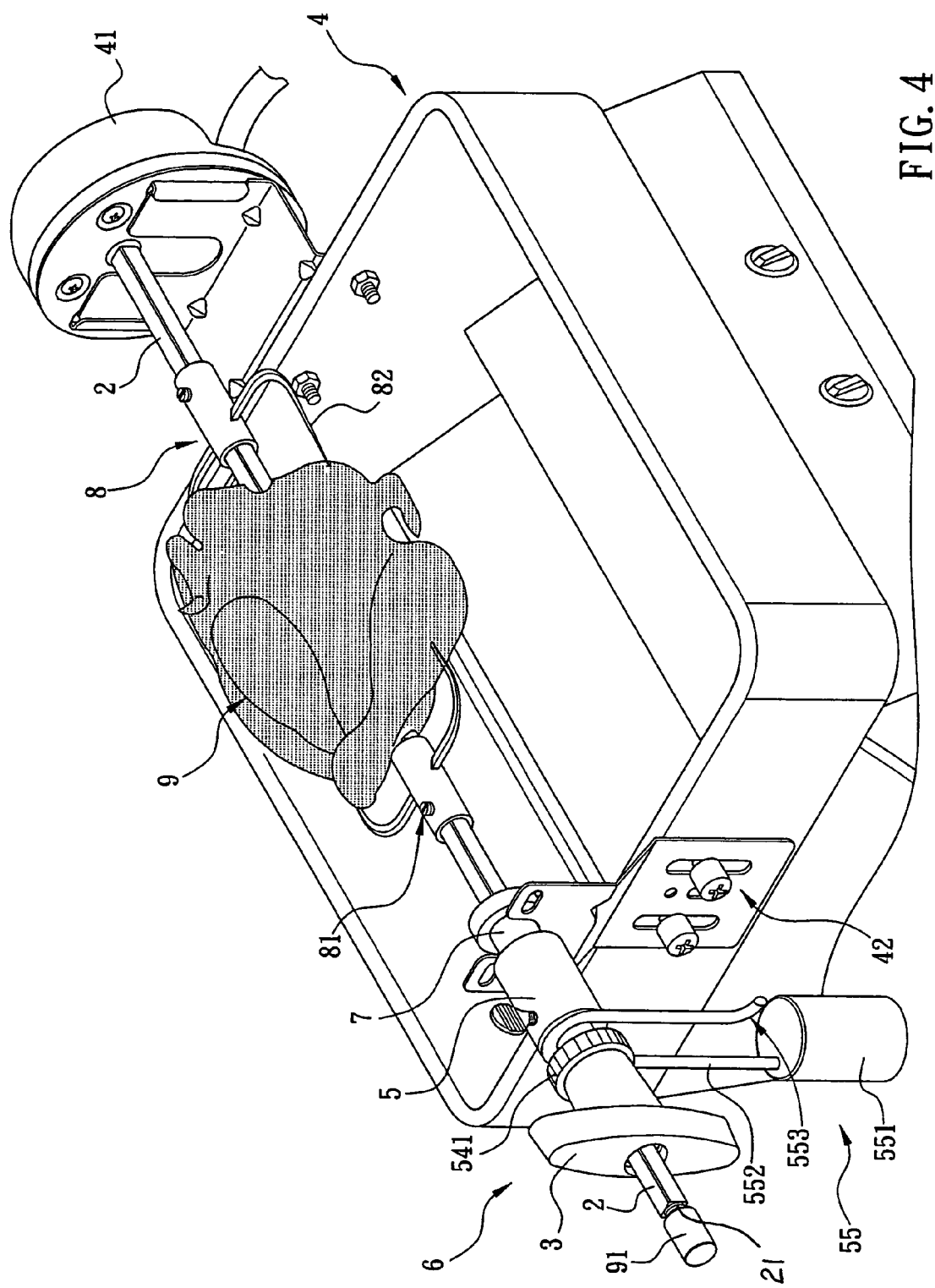
FIG. 4 is a perspective view of the barbeque stove according to another preferred embodiment of the present invention.

Since the fixing cover 6 is sheathed onto the rod 2, therefore the external diameter of the fixing cover 6 must be larger than that of the rod 2. When one end of the rod 2 is connected to the motor 41 and the fixing cover 6 is placed on the rod base 42, the rotary axis of the rod 2 will not be linear with the rotary axis of the motor 41, and may cause a substantial vibration. The pivotal cover 5 as shown in FIG. 3 of the present invention comprises a groove 7 proximate to another end proximate, such that after the fixing cover 6 as shown in FIG. 4 is placed on the rod base 42, the rotary axis of the rod 2 is close to the rotary axis of the motor 41, and thus will have less vibration during the rotation of the rod 2. Further, the rotary axis of the rod 2 will be identical to the rotary axis of the motor by adjusting the position of the rod base 42 on the barbeque stove 4.

Please refer to FIGS. 2 and 4. In this embodiment, the rod 2 comprises a fork section 8 disposed between both ends of the rod 2, and the fork section 8 comprises a lock 81 at one end, such that the lock 81 fixes the fork section 8 onto the rod 2, and the fork section 8 comprises a plurality of pointed members 82 protruded from another end, such that the fork section 8 can penetrate through food 9 (such as mutton, corn or chicken) by the pointed members 82 as shown in FIG. 4. Further, in the foregoing embodiment, the lock 81 comprises a screw section 811 disposed at one end facing the pivotal cover 5 and a screw hole 812 is disposed at a position where the fork section 8 and the rod 2 are coupled, such that the lock 81 can be secured into the screw hole 812 by the screw section 811 and extended to contact with the rod 2 and one end of the lock 81 presses on the rod 2 as to fix the fork section 8 onto the rod 2.

Please refer to FIG. 3. In the embodiments, a connecting section 54 is disposed at one end of the pivotal cover 5 and coupled precisely with the second liner 33, such that the pivotal cover 5 is coupled with the handle securely. Further, refer to FIG. 4. A weight member 55 is coupled onto the pivotal cover 5, and the appropriate weight provided by the weight member 55 can avoid the rod 2 from falling off from the motor 41 when the food 9 is connect unevenly onto the rod 2.

Please refer to FIG. 4 again. In the foregoing embodiments, the weight member 55 is comprised of a lump member 551 and a curved rod 552, wherein one end of the curved rod 552 is coupled with the lump member, and the other end is extended to a predetermined length along the direction away from the lump body 551 and then curved into an arc shape, and then extended to another appropriate length towards the lump member 551, and then extended towards the external edge of the lump member 551 to define a sliding section 553. Therefore, the weight member 55 can be sheathed into the pivotal cover 5 by the sliding section 553. Further, the pivotal cover 54 (as shown in FIG. 3) comprises a cover ring 541 disposed at an end away from the handle 3, and a retaining section 542 (as shown in FIG. 3) of the pivotal cover 5 being disposed between the cover ring 541 and the pivotal cover 5 and having an external diameter than that of the pivotal cover 5. When the cover ring 541 is removed from the pivotal cover 5, the weight member 55 can be coupled onto the retaining section 542 by the sliding section 553. Thus, the cover ring 541 is sheathed along the connecting section 54 from the connecting section 54 at an end facing the back of the retaining section 542, such that the weight member 55 will not move freely on the retaining section 542.

Please refer to FIG. 4 for another preferred embodiment of the present invention. After the handle 3 and the pivotal cover 5 are coupled and the fixing cover 6 is adjusted to a position away from or close to the motor 41 as to adjust the position of the fixing cover 6, the connecting section 21 precisely penetrates through the handle 3 and protrudes out of the barbeque stove 4. Therefore, a protective cover 91 can be installed onto the connecting section 21 to cover the connecting section 21 and protect the connecting section 21 from being cut or hooked by any other objects.

While the invention has been described by means of specific embodiments, numerous modifications and variations could be made thereto by those skilled in the art without departing from the scope and spirit of the invention set forth in the claims.

What is claimed is:

1. A barbeque stick for barbeque stove, comprising:
   a rod, having a connecting section disposed at one end; and
   a handle, having a latch section defined within said handle, said latch section being provided for movably latching a first liner, one end of said handle having a second liner, said handle coupling said first liner with said connecting section such that said rod and said handle define a barbeque stick;
   wherein said second liner is adapted for connecting a pivotal cover to form a fixing cover, and said fixing cover is sheathed onto said rod and separates said first liner from said latch section for enabling users to remove said handle, said fixing cover being movable to an appropriate position on said rod.

2. The barbeque stick of claim 1, wherein said rod comprises a pointed end disposed on said rod at a position opposite said connecting section.

3. The barbeque stick of claim 1, wherein said pivotal cover comprises a lock disposed at a position proximate to an end of said first liner.

4. The barbeque stick of claim 3, wherein said lock comprises a thread section disposed at a position facing an end of said pivotal cover, and a screw hole disposed at position where said pivotal cover and said lock are coupled, such that said lock is screwed into said screw hole by said thread section.

5. The barbeque stick of claim 1, wherein said pivotal cover comprises a groove disposed proximate to an end located away from said handle.

6. The barbeque stick of claim 1, wherein said rod comprises a fork section disposed between both ends of said rod, and wherein said fork section has a lock device at one end and a plurality of pointed members protruding from the other end.

7. The barbeque stick of claim 6 wherein said lock device comprises a screw section disposed at an end facing said pivotal cover and a screw hole disposed at a position where said fork section and said rod are coupled.

8. The barbeque stick of claim 1, wherein said pivotal cover comprises a cover ring disposed on said connecting section at an end away from said handle and a retaining section being disposed between said pivotal ring and said pivotal cover and having an external diameter small than that of said pivotal cover.

9. The barbeque stick of claim 8, wherein said retaining section comprises a weight member thereon.

10. The barbeque stick of claim 9, wherein said weight member is comprised of a lump body and a curved rod, and an end of said curved rod is coupled with said lump body and the other end is extended to a predetermined length towards the direction away from said lump body and then curved into an arc shape and extended to another predetermined length in the direction towards the lump body and then extended towards the external edge of said lump body to define a slide section.

11. The barbeque stick of claim 1, wherein said connecting section comprises a protective cover thereon.

* * * * *